United States Patent [19]

Straw

[11] 4,044,663
[45] Aug. 30, 1977

[54] NUT SHELLER

[76] Inventor: Jesse Harold Straw, R.R. No. 3, Box 193A, Tyrone, Pa. 16686

[21] Appl. No.: 665,560

[22] Filed: Mar. 10, 1976

[51] Int. Cl.² .......................... A23N 5/00; A47J 43/00
[52] U.S. Cl. ........................................ 99/577; 99/582
[58] Field of Search .................... 99/571, 577–578, 99/581–582; 100/265; 173/100; 72/436–437, 429; 30/120.1–120.5; 241/169, 169.2, 199.11

[56] References Cited

U.S. PATENT DOCUMENTS

| 831,912 | 9/1906 | Wadsworth | 72/437 |
| 1,883,529 | 10/1932 | Buckwalter | 99/582 |
| 2,069,877 | 2/1937 | Fix | 30/120.2 |
| 3,524,486 | 8/1970 | Turner | 99/571 |

*Primary Examiner*—Harvey C. Hornsby
*Assistant Examiner*—Robert Pous

[57] ABSTRACT

A nut sheller which embodies a base having a lower nut holder on which a nut to be shelled may be positioned, a spring operated hammer operable upwardly to strike the nut holder, an opposing inertia anvil operable from a remote nut loading position to a lowered position into engagement with the nut to be shelled, and a lever adapted to be manually moved to bring the inertia anvil down and then automatically cause the hammer to operate, the lever being operably connected to cock the hammer against its spring as the lever is moved back to its remote nut loading position. Shielding means are provided, moved under the control of the operating lever so that the shell fragments fall into a nut bowl arranged below and around the nut holder. Thus the entire nut shelling operation may be accomplished by one hand, merely by moving the lever in one direction and then returning it.

7 Claims, 4 Drawing Figures

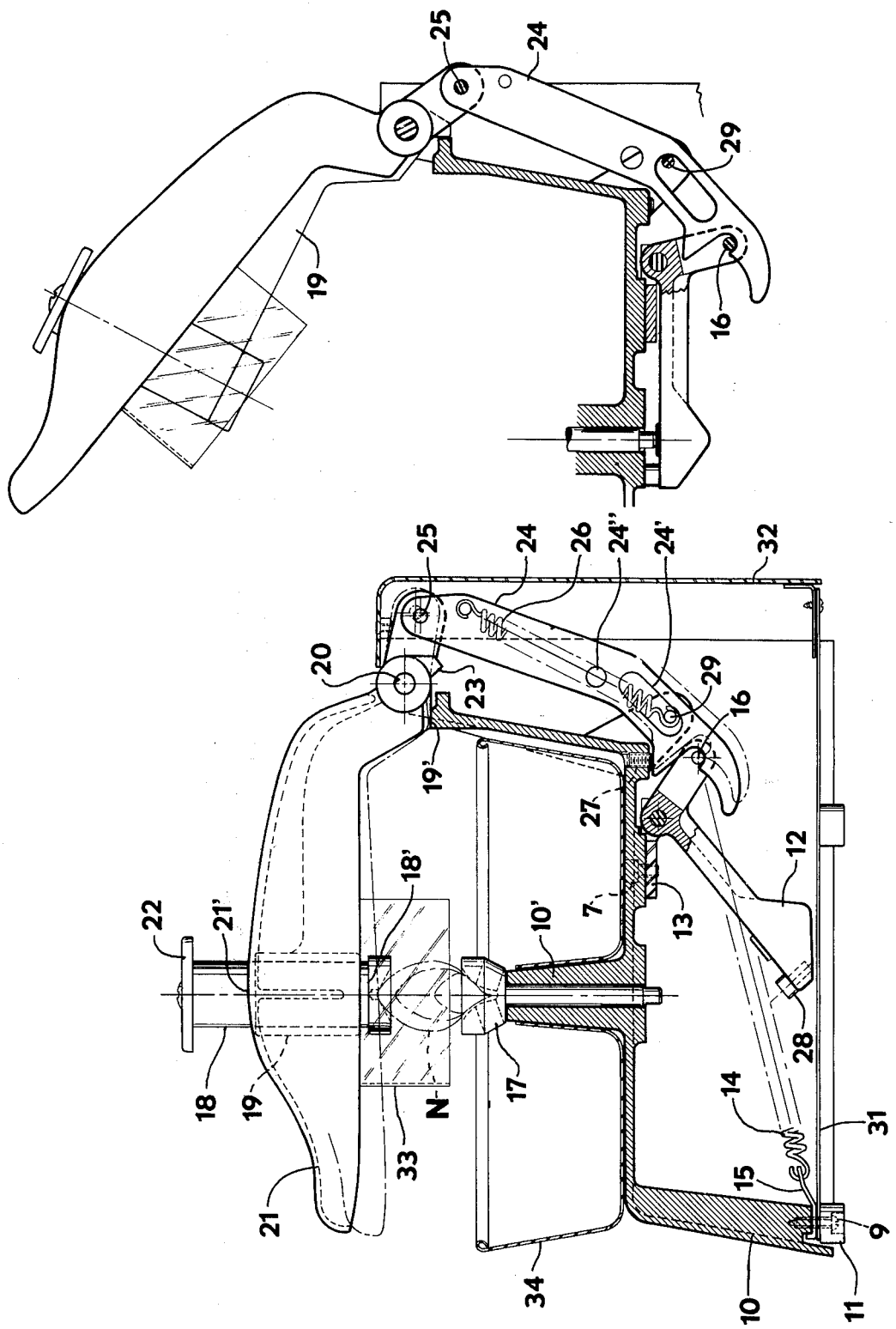

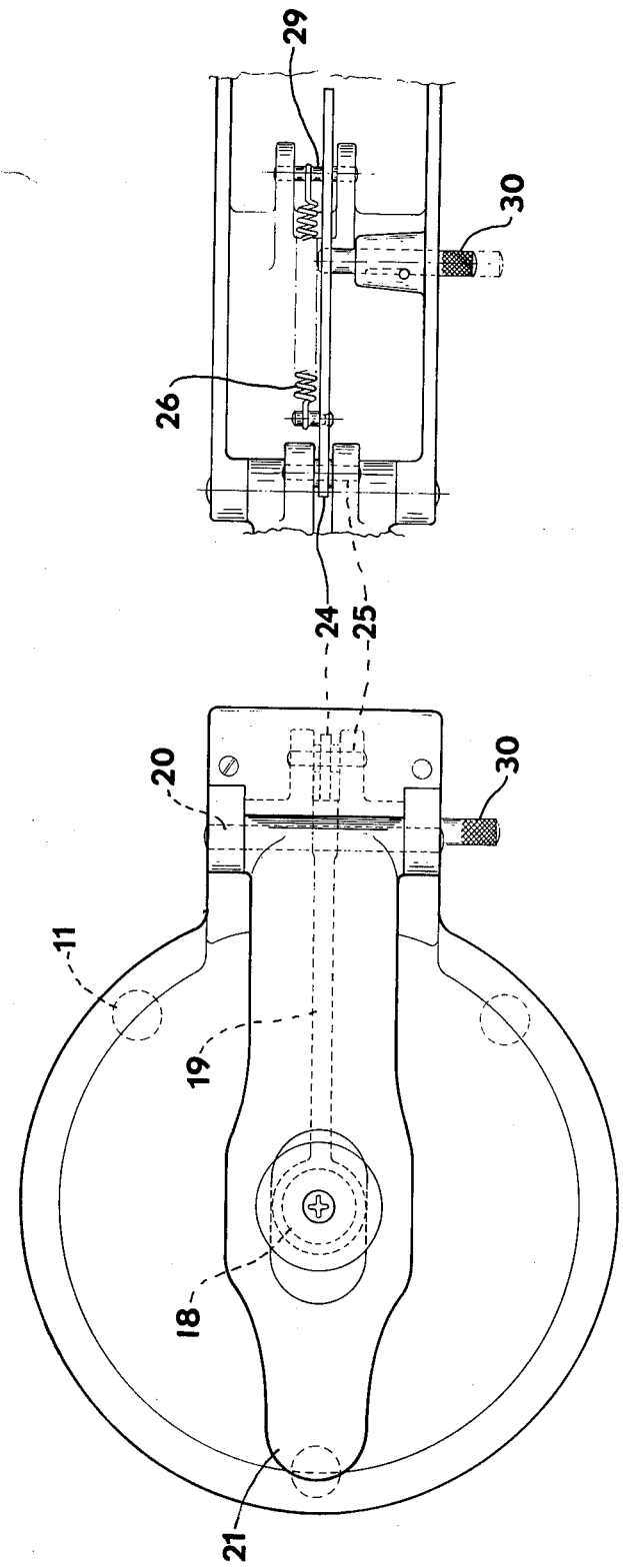

NUT SHELLER

The device of this invention relates to improvements in a nut sheller, easily manipulateable and yielding a satisfactory opening of the shell without injury to the kernel.

The object of this invention is to provide a simple, pivotal action while breaking nut shells.

Another object is to provide means to confine the broken shell fragments.

Another object is to provide a set of vertically opposed anvils which will effectively confine the nut for breaking.

Another object is to provide means for applying the inertia of a hammer blow to the nut.

Another object is to provide a simple hand operable device for obtaining a whole kernel from a broken nut.

Another object is to provide means for accommodating nuts of any size and shape without the necessity of mechanical adjustment.

The foregoing objects outlined and other relative and supplemental features are all contained in the preferred embodiment of the invention illustrated in the accompanying drawing in which:

FIG. 1 is a side elevation partly in vertical cross section showing a preferred form of the nut sheller.

FIG. 2 is a fragmentary cross section of the device showing the upper mechanism in the open nut loading position.

FIG. 3 is a plan view of the device showing the functional relationship of the operating lever to the opposing anvil bracket pivoted on a common axis.

FIG. 4 is a fragmentary projection of the locking pin to lock the operating lever in a horizontal position for handling and storing.

Referring in more specific detail to the accompanying drawing, the preferred arrangement of the nut sheller comprises a cast base 10 which among other materials may appropriately be constructed of a sand or die cast aluminum alloy, and arranged with three or more rubber feet 11. A pivoted hammer 12 preferably of a cast material is mounted on a hinge member 13 which is attached rigidly by screws 7. Two springs 14 of selected characteristics are attached at their fixed ends to a bracket 15 which is latched onto the base casting and held in position by the front rubber foot mounting screw 9. The actuating ends of springs 14 are attached to either ends of the cocking pin 16 fixed in the lever portion of hammer 12. A nut holder or impinging anvil 17 is held with freedom of vertical movement in a hole prepared to contain the stem portion of the anvil, in the stump-like projection 10' integral with the base. Nut holder 17 is readily removable to interchange with others of different end configurations for broader usefulness. Vertically opposed to the nut holder 17 is the opposing inertial anvil 18 also slideably contained in a suitable bore in bracket 19 which is hinged on a common pivot pin 20 with operating lever 21. The opposing anvil is of sufficient weight to provide the most ideal inertia for its function, and is free to move vertically a distance slightly exceeding the difference between a large and small nut. Attached to the top of opposing anvil 18 is a cap 22 of sufficient size to make contact with surface 21' on operating lever 21, in the absence of a nut in shelling position. With this arrangement it is obvious that when operating lever 21 is moved to the open position shown in FIG. 2, opposing anvil 18 will be carried upward to the limit provided by shoulder 18', at which time in the movement, bracket 19 resting on stop lug 19', will be picked up and will follow to the open position. In the event a build up of friction or for any cause, bracket 19 would tend to follow lever 21 before opposing anvil 18 moves to its upward limit, the lug 23 will provide a stop to limit movement of bracket 19 to a fixed open position in such a manner that when operating lever 21 continues to its open position opposing anvil 18 will be reset in proper arrangement to begin a normal subsequent shelling cycle. Link 24 is attached to a link arm integral with operating lever 21 by a link pin 25 and is arranged in configuration so that when operating lever is returned to open position, the hooked end of link 24 will latch onto cocking pin 16, spanning the slot cut in the lever arm of hammer 12 as shown in FIG. 2. The hook end of link 24 is urged toward cocking pin 16 by spring 26 which also will tend to balance operating lever 21. When operating lever 21 is moved from open position shown in FIG. 2 toward the closed position shown in FIG. 1, link pin 25 will pull link 24 which in turn pulls cocking pin 16, pivoting hammer 12 into the cocked position shown in FIG. 1. Included in the configuration of link 24 is a cam surface which, in FIG. 1, at this point in the cycle, has made contact with the trip adjustment screw 27 while still holding hammer 12. Moving operating lever 21 to its lowest position shown in broken outline, trip adjustment screw will deflect link 24 to release spring loaded hammer 12 completing the nut shelling cycle. The bumper 28 fixed to hammer 12 and composed of material having the desired resilience to provide a cushioned stop, will limit the amount of movement of hammer 12. In addition to the explained configuration of link 24 is a slot 24' of the size and location to provide a limit stop for operating lever 21 in both upper and lower extreme positions, around stop pin 29 fixed in a slotted projection from base casting 10. Also in link 24 is a hole 24" of the size and location that, when desired, lock pin 30 (FIG. 4) is pushed inward, operating lever 21 will then be locked in the most ideal position to serve as a handle to carry and/or store the unit when not in use. Bottom cover 31 and back cover 32 completely enclose the impinging mechanism avoiding any liability of injury to inexperienced operators. Shield 33 confining the flying fragments of the nut shell may be appropriately attached to, or cast integrally with operating lever 21. In either arrangement it is obvious from the above description of the nut shelling cycle, that the shield will not interfere with operator when placing the nut in shelling position, yet will adequately surround the nut at the moment of breaking the shell.

Nut bowl 34 is arranged to fit over the projection 10' of base 10, so that no other locators are needed to keep it in position and is removable and free to be turned as needed for selecting nuts for shelling.

In use, the operator places a selected nut into the suitably shaped depression in the nut holder 17, the lever 21 is pressed to the dotted position causing the hammer 12 to strike the nut holder 17 causing the nut shell to burst outwardly. The position of the shield 33 will force the fragments to fall into bowl 34 leaving behind the whole kernel of the nut. Provision in the upper portion of the nut holder is made to shed fine particles of shells to maintain proper contact with nut.

While I have disclosed what I now consider to be a preferred embodiment of my invention, I am aware that changes may be made in the details disclosed without departing from the spirit of the invention, as expressed in the claims.

What I claim and desire to secure by Letters Patent is:

1. A nut sheller comprising a base, a nut supporting anvil mounted on said base for limited movement, an opposing inertial anvil operably mounted on said base for movement into engagement with a nut to be shelled and for movement to a remote position for loading a nut into shelling position, a hammer for operating against the nut supporting anvil, spring means for operating said hammer and an operataing lever for moving the inertial anvil and also controlling the hammer, a link having an operable connection to said operating lever and an operable connection to said hammer for energizing the spring as the operating lever moves the opposing anvil from its position remote from the nut to be shelled, and upon being operated provides a shelling of said nut with an opposing spring activating a hammer blow.

2. A device as set forth in claim 1 in which there is a coaxial pivotal mounting on the support for the opposing inertia anvil and for the operating lever.

3. A device as set forth in claim 1 wherein a bowl is removably mounted on said support for holding nutshells, said support having an upwardly extending portion in which the nut holding anvil is slidably guided and the projection acts to center the bowl.

4. A device as set forth in claim 1 wherein an adjustment is provided to vary the instant of release of the hammer in the nut breaking cycle.

5. A device as set forth in claim 1 wherein a shield is provided to move with opposing anvil.

6. A device as set forth in claim 1 in which the nut supporting anvil is slidably supported for substantially vertical movement on the base, and in which the opposing inertia anvil and the operating lever are coaxially pivoted on the base and in which a linkage is provided between the hammer and the operating lever for releasing the hammer after the opposing inertia anvil engages a nut to be shelled and upon further movement of the operating lever.

7. A device as set forth in claim 1 in which is a cam surface on the operating lever in operable contact with an opposing surface attached to opposing inertia anvil for providing an axial movement, in addition to and extending a swinging motion to make a substantially vertical contact within a size range of the nuts to be shelled.

* * * * *